Patented May 8, 1951

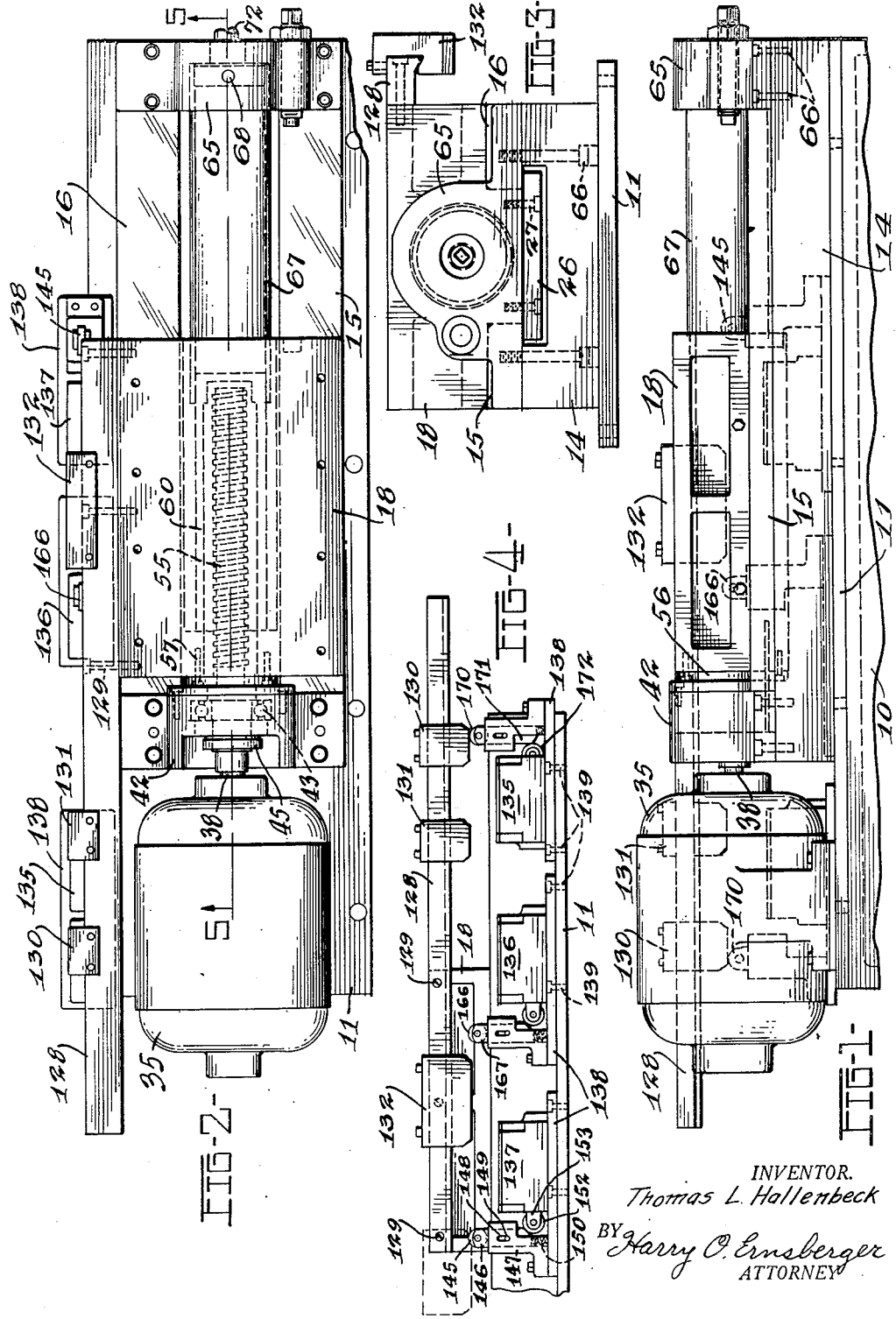

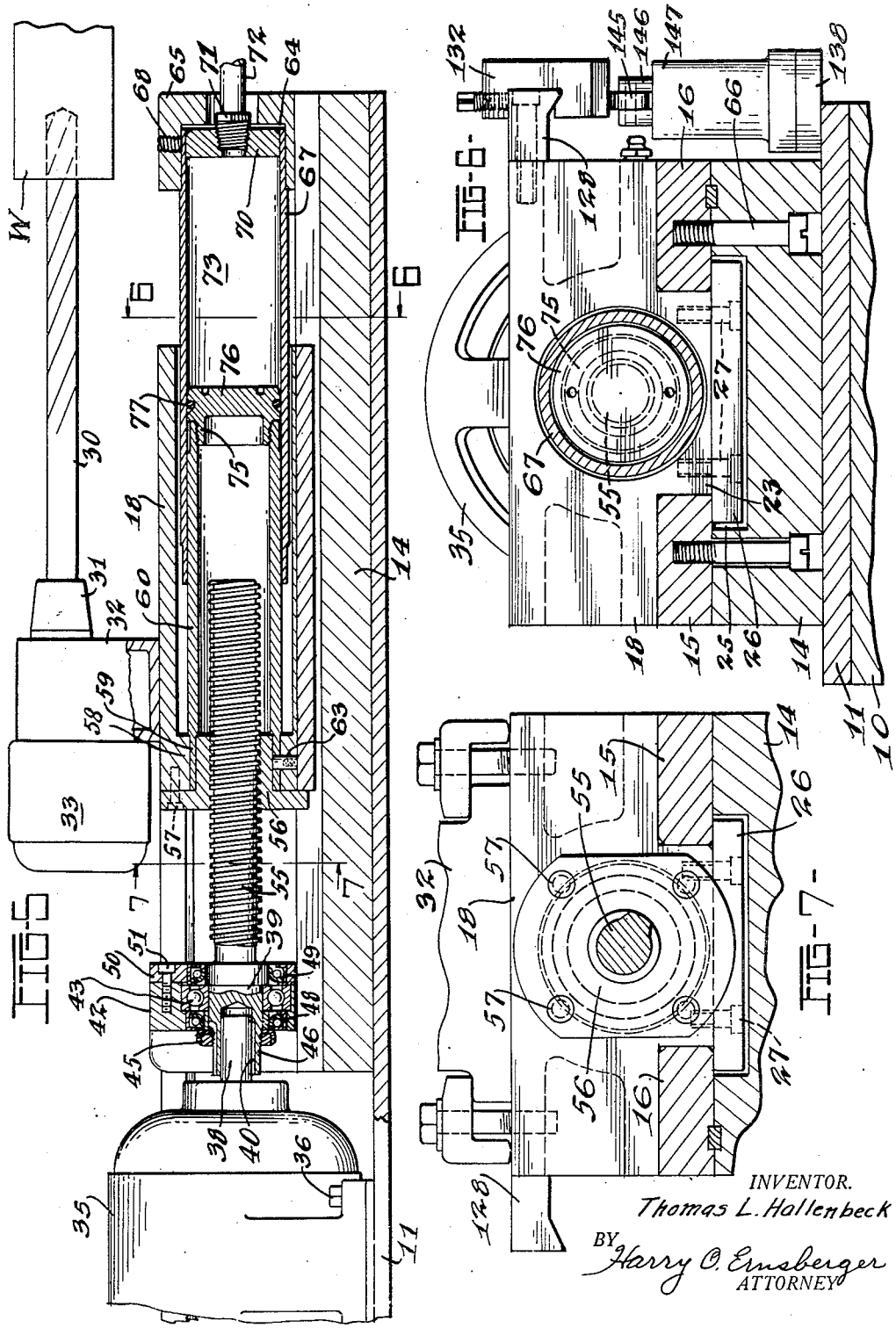

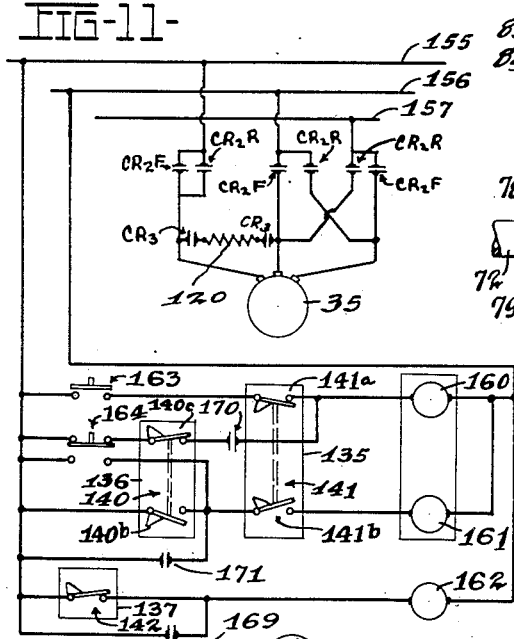

2,552,041

UNITED STATES PATENT OFFICE 2,552,041

MOTOR CONTROL FOR MACHINE-TOOL DRIVES

Thomas L. Hallenbeck, Toledo, Ohio, assignor to Baker Bros. Inc., Toledo, Ohio, a corporation of Ohio Application November 8, 1946, Serial No. 708,783

3 Claims. (Cl. 318—302)

This invention relates to a method and apparatus for driving mechanism and more especially to a method and apparatus for actuating and controlling mechanism of machine tools.

The invention comprehends the provision of a driving system or means for a machine tool element wherein a mechanical drive is employed in conjunction with fluid means for regulating and controlling the speed of the mechanism.

The invention embraces the provision of a mechanical drive for a movable machine element acting in cooperation with a fluid medium, the arrangement including means for determining the rate of fluid flow to control and regulate the rate of movement of the driven machine element.

An object of the invention is the provision of a system and apparatus for moving and controlling the movement of a machine tool carriage or saddle whereby a high-torque, high-slip motor of the polyphase induction type is arranged to be connected directly to the carriage by positive drive mechanical means operating in conjunction with a controlled flow of a fluid medium for determining the rate of movement of the carriage.

Another object of the invention is the provision of a driving and controlling means for a machine tool carriage wherein a high-torque, high-slip motor is directly connected to drive the carriage associated with a fluid resistance and fluid metering or flow controlling device for determining the rate of movement of the carriage, the arrangement being such that the rate of movement of the carriage is proportional to the speed of rotation of the driving motor.

Still another object of the invention is the provision of a method and apparatus for driving a machine tool platen or carriage wherein the driving mechanism acts against a fluid resistance in conjunction with means for regulating the flow of fluid to determine the rate of movement of the platen or carriage without unnecessary circulation of the fluid, hence maintaining the fluid at a minimum operating temperature.

Still another object of the invention resides in the provision of a driving means for a machine tool carriage wherein the speed of the carriage is controlled by rate of fluid discharge and is directly proportional to the speed of rotation of the driving motor whereby resistance to movement of the carriage set up by contact of a tool with the work upon which operations are to be performed will be dissipated as heat generated in the driving motor where it may be quickly radiated to the surrounding atmosphere instead of such heat energy arising in the circulating fluid.

A further object of the invention resides in the use of an apparatus for a machine tool carriage drive including a reversible motor operating in conjunction with a fluid resistance medium, the rate of discharge of which regulates the movement of the carriage in a direction of work performing operations and whereby the driving motor may be reversed to return the carriage to its initial position and simultaneously refill the fluid chamber with fluid preparatory to the initiation of a succeeding work performing movement of the machine tool carriage.

Still another object of the invention resides in an arrangement of mechanical drive for a machine tool carriage in association with a fluid resistance and a fluid metering device for regulating the rate of flow of the fluid for normally determining the rate of movement of the carriage during tool feed operations the arrangement including electrically actuated means for rendering said fluid metering device ineffective to secure rapid traverse of the carriage.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view showing a portion of a machine tool and illustrating a form of carriage driving system and apparatus of my invention;

Figure 2 is a top plan view of the apparatus shown in Figure 1;

Figure 3 is an end view of the construction shown in Figures 1 and 2;

Figure 4 is a view of the opposite side of the machine tool carriage illustrating elements of the controlling apparatus for the carriage;

Figure 5 is a horizontal sectional view taken substantially on the line 5—5 of Figure 2;

Figure 6 is a transverse sectional view taken substantially on the line 6—6 of Figure 5;

Figure 7 is a transverse vertical sectional view taken on the line 7—7 of Figure 5;

Figure 8 is a vertical sectional view showing a fluid reservoir and fluid flow controlling means forming a part of the invention;

Figure 9 is a top plan view of the arrangement shown in Figure 8;

Figure 10 is a side view of the construction shown in Figure 8, and

Figure 11 is a schematic diagram showing a circuit arrangement of the electrically energized control and actuating mechanisms utilized in the system and apparatus.

While the method and apparatus of my invention are illustrated as applied to the operation and actuation of a machine tool carriage it is to be understood that I contemplate the utilization of my invention wherever the same may be found to have utility.

Referring to the drawings in detail, the bed or main frame of a machine tool is indicated at 10 upon which is supported a base plate 11, and mounted upon the plate 11 is a supplemental frame 14. The frame member 14 supports a pair of ways 15 and 16 which in turn support a movable carriage, platen or saddle 18 which is slidable longitudinally of the machine frame along the ways 15 and 16. The carriage 18 is formed with a depending tang portion 23 disposed between the laterally vertically spaced surfaces of the ways 15 and 16 which serve to guide the carriage 18 in its movement. The frame member 14 is formed with a longitudinally extending recess 25 adapted to accommodate a plate 26 which is secured to tang 23 by means of screws 27. The plate projects laterally beneath portions of ways 15 and 16 so as to maintain the carriage in proper relation on the ways.

The carriage or platen 18 may support the work upon which machine operations are to be performed, or it may be arranged to support a tool for performing the machine operations, the latter arrangement being illustrated in the present embodiment. The form of tool illustrated is a drill 30 carried by a suitable chuck 31 driven by gearing contained within a gear box 32. The mechanism within the gear box is driven by an electric motor 33. Longitudinal movement of the carriage 18 in a right hand direction as viewed in Figure 5 will carry the drill or tool 30 into engagement with the work W.

The method and means for actuating the carriage to cause the latter to operate along the ways 15 and 16 will now be described. An actuating motor 35 is mounted upon the base plate 11 by means of bolts 36. The motor 35 is of the polyphase induction type having high-torque, high-slip characteristics. The shaft 38 of the motor 35 extends into a bore formed in a member 39 and is arranged to drive the latter by means of a key or feather 40. Mounted upon the frame 14 is casing or member 42 which is configurated to house or enclose an antifriction bearing 43, that illustrated being of the ball type and upon which member 39 is journaled as illustrated in Figure 5. Member 39 is held in assembled relation with the bearing construction by means of a collar 45 threaded on to a sleeve portion 46 integrally formed on member 39 extending exteriorly of the bearing construction 43. The bearing 43 is provided at either side with lubricant sealing devices 48 and 49 in order to retain lubricant within the bearing 43. A plate 50, secured to member 42 by means of screws 51, serves to retain the bearing assembly 43 in position in member 42.

The member 39 is integrally formed with a threaded extension or screw 55 preferably of the square thread type upon which is mounted a threaded nut or bushing 56, the threaded bushing 56 being fixedly secured to the carriage 18 by means of screws 57. The carriage 18 is provided with an inwardly extending flange or boss 58 and fitting within a cylindrical bore formed in boss 58 is a reduced cylindrical extension 59 forming an integral part of a sleeve or tubular member 60. The extension 59 of sleeve 60 is fixedly secured to the boss 58 by a dowel 63 or other suitable means as shown in Figure 5. The frame portion 14 of the machine is provided at one end with an upwardly extending block 65 which is secured to the frame plate 14 by means of screws 66. As shown in Figure 5, the block 65 is formed with a cylindrical bore or recess 64 within which is snugly fitted the extremity of a sleeve or cylinder 67, the sleeve being locked or secured in position in the bore 64 by means of a set screw 68. The extremity of sleeve 67 within the block 65 is fitted with an end wall or head 70 the same being provided with a threaded opening to receive a fitting 71 for connecting a fluid conveying tube 72 with the head 70. The sleeve 67 provides a fluid receiving cylinder or chamber 73 adapted to receive and contain oil or other fluid for purposes to be hereinafter explained.

The sleeve 60 is adapted to extend into and slidably fit the interior of the cylinder 67. The extremity of sleeve 60 extending into the cylinder is formed with a threaded portion adapted to receive a threaded tenon 75 of a head 76 forming a piston slidable within the sleeve 60. The head 76 is provided with a circumferential groove in which is disposed a suitable packing ring or sealing device 77 to prevent leakage of fluid around the head 76.

The tube 72 is connected with a fluid reservoir 80 shown in Figure 8 which is adapted to be positioned above the cylinder or chamber 73 so that oil or other fluid contained within the reservoir will flow into cylinder 73 aided by the influence of gravity upon retraction of the piston 76. The reservoir 80 is formed with a bottom plate 81 and a removable top or closure 82, the latter being held in position by means of screws 83 threaded into openings provided in gussets 84 disposed at the corner portions of the reservoir and welded or otherwise secured to the walls of the reservoir.

Mounted upon the bottom plate 81 within the reservoir is a secondary plate or support 86, and projecting upwardly from plate 86 are spaced tubular members 87. Supported upon the upper ends of the tubular members 87 is a member 88 which forms a closure or end plate of a fluid metering or fluid flow controlling device 89. As the fluid metering device employed is of conventional construction the details of mechanism thereof have not been illustrated. The rate of flow of fluid metered through the device 89 may be regulated by means of a shaft 95 which is connected to the mechanism contained within the "metering" device and is arranged to adjust the area of an orifice to regulate fluid flow therethrough. The shaft 95 is formed at its outer end with a reduced tenon 97 which projects through an opening in the closure 82 as shown in Figure 8. Fixedly mounted upon the portion of tenon 97 projecting exteriorly of the closure 82 is a control member or knob 99 for rotating the shaft 95 and which is secured by means of a pin 98. The knob 99 is formed with a disc-like flange 100 bearing a series of indicia for indicating the relative adjustments of the knob corresponding to the various rates of flow of oil or fluid through the metering device 89, the desired rate of flow being attained by adjusting the position of the knob 99.

Means are provided for establishing communication between the fluid conveying tube 72 and the reservoir 80 for bypassing or circumventing the metering device 89. To this end a fixture or member 104 is suspended from a supporting plate 105 by means of screws 106 mounted in depending ear portions 107 integrally formed on plate 105. The fixture 104 is provided with a threaded opening adapted to receive a coupling 108 having a central passage 109 which is in communication with the tube 72. The coupling 108 passes through an opening in a side wall of the reservoir, a sealed joint being effected by means of sealing gasket 78 and a securing nut 79.

The member 104 is provided with a vertically arranged cylindrical bore within which is slidably disposed a sleeve-like valve 111. Arranged substantially in alignment with coupling 108 is a second threaded opening in the opposite side of member 104 adapted to accommodate a tube 112 which leads into the fluid metering device 89. As particularly shown in Figure 8, the interior of the cylindrical bore in fitting 104 is formed with an annular recess 114 which establishes communication between the passage 109 and the tube 112.

The sleeve-like valve 111 is provided at its upper end with a threaded bore adapted to receive a threaded tenon 116 formed upon a link 117 which is pivotally connected to a member 118 forming a part of the armature of an electrically energizable solenoid mechanism contained within housing or closure 120. The valve member 111 is provided with a central bore 121 within which is accommodated a contractile coil spring 122. The upper end of the spring is secured to the sleeve by means of a pin 123 while the lower end of the spring is anchored to a post 125, secured in the mounting plate 86 carried by the bottom wall 81 of reservoir 80. As will be hereinafter explained, the energization of the solenoid mechanism 120 elevates member 118 and the sleeve-like valve 111 so as to establish uninterrupted communication between the tube 72 and passage 109 with the interior of the reservoir 80. Thus when the sleeve 111 is elevated to its uppermost position, fluid from the chamber 73 may be discharged from tube 72 directly into the reservoir without passing through the metering device 89.

Means are provided for limiting the movement of the carriage 18 in each direction and for controlling the energization of the solenoid mechanism 120. Mounted at one side of carriage 18 is a horizontal bar or rail 128 which is secured to the carriage by means of screws 129 or other suitable means. Slidably and adjustably mounted upon the bar 128 are controlling cams or blocks 130, 131 and 132. Mounted upon the sub-base plate 11 are switch mechanisms or circuit controlling devices enclosed within suitable housing or casings 135, 136 and 137, the housing being mounted upon plates 138 which are secured to the relatively stationary sub-plate 11 by means of screws 139. A switch mechanism 140, diagrammatically illustrated in Figure 11, contained within housing 136 is adapted to limit the forward travel of the carriage 18 while the switch mechanism 141 contained within the housing 135 is arranged to limit the reverse travel of the carriage and establish its initial or starting position. The cam 132 is arranged for cooperation with a switch mechanism 142 contained within housing 137, cam 132 serving to determine the length of carriage movement in slow or tool feed traverse. Any number of cams 132, or a single cam with a particular contour may be employed for cooperation with the switch mechanism 142 to provide a series of intermittent periods of slow or feed traverse and rapid or idle traverse, in a manner to be hereinafter explained.

As will be apparent from Figure 4, the mechanisms for translating the cam action to the switching means are identical for the several switching means, and a description of one will suffice. Thus as a typical explanation of these mechanisms, the control cam 132 is adapted for engagement with a roller 145 journaled in the upper end of a vertically movable plunger 146 mounted in a vertical bore formed in a bracket 147, the extent of vertical movement of plunger 146 being determined by a slot 148 cooperating with a pin 149, the plunger 146 being at all times resiliently urged toward its uppermost position by means of an expansive spring 150. The lower end of the plunger 146 is canted or beveled for progressive engagement with a roller 152 journaled upon the end of a horizontally movable plunger 153 which is arranged for slidable movement in the housing 137. The movement of the horizontal plunger 153 actuates the switch mechanism 142 contained in the housing 137.

The switches 140 and 141 contained in housing 136 and 135 are arranged as shown in the drawing Figure 4 to initiate forward rotation and rearward rotation of the motor 35.

Figure 11 illustrates a form of wiring diagram of a typical circuit utilized with the arrangement. In the diagram, the power supply wires are indicated at 155, 156 and 157, the solenoid operating the valve 111 being illustrated at 120. Numbers 160, 161 and 162 indicate relays adapted for cooperation with the switching mechanisms 141, 140 and 142 in a manner hereinafter explained.

The relays indicated at 160 and 161 form together what is conventionally referred to as a three-phase magnetic reversing starter, the relay 160 being provided with normally open circuit contacts 170, while relay 161 is provided with two normally open circuit contacts or interlocks 169 and 171. Relay 162 is of the magnetic three-poly contactor type. The relay 160 is arranged for controlling rotation of the motor to establish forward movement of the carriage 18 while relay 161 is adapted to reverse the direction of rotation of the motor. A starting switch is indicated at 163 and an emergency return switch is indicated at 164.

A typical operating cycle of the machine tool feed mechanism of my invention is as follows: Assuming it is desired to drill or bore through the work W, the motor 33, which rotates the drill 30 or other tool, is energized from a power source of electrical energy in a conventional manner (not shown). The carriage or platen actuating motor 35 is subsequently energized by manually closing the starting switch 163. As the upper contact of switch 141 is in closed position as shown in Figure 11, the relay 160 is energized, and contacts designated $CR_2F$ are closed thereby to complete the circuit to the motor 35 for rotating the latter in a direction to move the carriage 18 in a forward or right hand direction as viewed in Figure 5. As the contacts of switch 142 are normally closed when cam 132 is out of engagement with roller 145, current will flow through relay 162 to close the contacts designated $CR_3$ and energize the solenoid 120 and elevate the sleeve valve 111 to establish a fluid passage from cylinder 73 through tube 72 and passage 109 directly into the reservoir 80 thus by passing the fluid metering device 89. As the flow of fluid from cylinder 73 to the reservoir 80 is thus substantially unrestricted, the oil or fluid in chamber 73 will be discharged at a comparatively rapid rate, and as the resistance to the rotation of the motor 35 is thus lessened its speed is comparatively rapid and the carriage 18 moves forward at a correspondingly rapid rate. This rapid movement of the carriage is referred to as "rapid traverse" as the tool or drill 30 has not engaged the work W. As shown in Figure 4, with the carriage 18 in initial or starting position, the cam 130 is in engagement with roller 170 which condition biasses the upper contact 141a to closed position as illustrated in Figure 11. As soon as the carriage 18 is moved forwardly a distance sufficient to disengage cam 130 from roller 170, contact 141a is broken and contact 141b is biassed to closed position by spring means.

When the motor 35 is energized in a forward direction as above pointed out, it rotates the threaded screw 55 and causes a longitudinal movement of the nut 56, carriage or platen 18 and piston 76 in the cylinder 73 forcing oil out of the cylinder into the reservoir 80, and as little resistance is offered to the flow of oil into the reservoir, a period of "rapid traverse" of the carriage ensues.

As the carriage reaches a position where the drill or tool approaches the work W for performing a drilling or other operation thereon, the speed of the carriage and tool must be greatly reduced. To accomplish this, the tool feed control cam 132 is adjusted to a position on the bar or rail 128 whereby as the drill 30 is adjacent the work W, the cam 132 engages roller 145 to separate the normally closed contacts of switch 142. This action de-energizes the magnetic contactor switch 162, opening the contacts designated CR₃ and de-energizing the coil of solenoid 120. The armature 124 thereof and the sleeve valve 111 are pulled downwardly by the contractile stress of spring 122 to the position shown in Figure 8. Thereafter the fluid in chamber 73, which is forced out of the chamber 73 by the piston 76 through tube 72 and passage 109, must pass through the annular recess 114 and tube 112 through the metering device 89, the orifice of which has been set by manipulation of knob 99 to permit the flow of fluid through the metering device at a predetermined rate after which the oil is discharged into the reservoir 80. Thus while motor 35 is rotating in a direction to move the carriage 18 forwardly, its movement is resisted by oil contained in chamber 73, and as the rate of discharge of the oil has been greatly reduced, the motor is caused to slow down to a speed proportionate to the rate of discharge of oil through the metering device 89. As motor 34 is of the polyphase induction type having high-torque and high-slip characteristics it will slow down but its effective torque is increased so that the carriage will move forward slowly at a rate permitted by the rate of fluid discharge through the metering device 89 and with an adequate capacity to force the drill 30 through the work W.

During the passing of the drill or tool through the work, the cam 132 remains in engagement with the roller 145 to de-energize the solenoid circuit as the contacts of switch 142 are held open. When the tool has completed its work operation, the cam 131 is set or adjusted upon the rail 128 so as to engage the roller 166 and actuate the switching mechanism 140 in housing 136. This action closes contact 140b, opening contact 140c, and through the relay 160 opens the contacts CR₂F. The circuit is thus completed through relay 161 to close contacts CR₂R including those designated by numeral 169. By this means, the direction of the motor is reversed and the carriage moved in the opposite direction toward its initial or starting position. As contact 169 is closed by energization of relay 161, a circuit is completed bridging the switch 142 and energizing the solenoid 120 to elevate the sleeve valve 111 so that fluid or oil in the reservoir 80 may flow through passage 109 and tube 72 into the cylinder or chamber 73 as the piston 76 is withdrawn by return movement of the carriage 18. The solenoid is continuously energized throughout the return movement of the carriage, and as fluid is permitted to flow into the chamber 73 without appreciable restriction, the carriage returns at "rapid traverse" rate. I have found it desirable to position the reservoir 80 slightly above the chamber 73 in order that the force of gravity will aid in the return flow of oil from the reservoir 80 to the cylinder.

When the carriage reaches its initial position, the cam 130 again engages the limit switch mechanism 141, closing the contact 141a in preparation for a succeeding cycle and breaking the contact 141b to stop the motor. As the contacts 169 are closed by relay 161, a de-energization of this relay breaks the circuit through the relay 162 and de-energizes the solenoid 120 controlling the valve 111.

It will be apparent that any number of tool feed and rapid traverse periods may be had by employing two or more control cams 132 or by configurating a cam block with a series of spaced lobes and recesses for initiating the operation of the switch 142 controlling the solenoid 120 and valve 111 during forward movement of the carriage.

It should be noted that through the use of a polyphase induction motor having high-torque and high-slip characteristics, the motor speed is proportional to the carriage speed. Moreover the circulation of fluid is reduced to a minimum, hence the heat of resistance to work performing operations is developed in the motor where it is rapidly dissipated into the surrounding atmosphere. In this system, the oil is maintained at a low temperature, thus enhancing the efficiency and control of the machine.

It is apparent that, within the scope of the invention, modifications and different arrangements may be made other than is herein disclosed, and the present disclosure is illustrative merely, the invention comprehending all variations thereof.

What I claim is:

1. Actuating means for a machine tool carriage including a reversible, electrically energizable motor having high-torque, high-slip characteristics, a threaded shaft which is mounted against axial movement and which is driven by said motor, a hollow piston connected to said carriage and having a portion which threadedly engages said threaded shaft, said motor providing the sole power for advancing and retracting said carriage through the agency of said threaded shaft and piston, a cylinder which is occupied by said piston and which is adapted to accommodate a body of liquid for controlling the rate of traverse of said carriage by offering varying resistance to the movement of said piston in said cylinder, a reservoir for a body of said liquid, a conduit connecting said cylinder with said reservoir and through which liquid flows from said cylinder to said reservoir during feeding strokes of said carriage and from said reservoir to said cylinder during return strokes of said carriage, a metering device for reducing the rate of flow of liquid from said cylinder to said reservoir during a portion of the travel of said carriage to reduce the feeding rate of said carriage and at the same time increase the effective torque of said motor, and an electrically energizable valve controlled by said carriage for by-passing said metering device during another portion of the travel of said carriage to increase the rate of flow of liquid from said cylinder to permit said carriage to be driven at an increased rate by said motor.

2. Actuating means for a machine tool carriage including a reversible, electrically energizable motor having high-torque, high-slip characteristics, a threaded shaft coaxial with and directly coupled to the armature shaft of said motor, the threaded shaft being mounted against axial movement and being driven by and at the same speed as said armature shaft, a hollow piston connected to said carriage and having a portion which threadedly engages said threaded shaft, said motor providing the sole power for advancing and retracting said carriage through the agency of said threaded shaft and piston, a cylinder which is occupied by said piston and which is adapted to accommodate a body of liquid for controlling the rate of traverse of said carriage by offering varying resistance to the movement of said piston in said cylinder, a reservoir for a body of said liquid, a conduit connecting said cylinder with said reservoir and through which liquid flows from said cylinder to said reservoir during feeding strokes of said carriage and from said reservoir to said cylinder during return strokes of said carriage, a metering device in said reservoir with which said conduit communicates for reducing the rate of flow of liquid from said cylinder to said reservoir during a portion of the travel of said carriage to reduce the feeding rate of said carriage and at the same time increase the effective torque of said motor, and an electrically energizable valve controlled by said carriage for by-passing said metering device during another portion of the travel of said carriage to increase the rate of flow of liquid from said cylinder to permit said carriage to be driven at an increased rate by said motor.

3. Actuating means for a machine tool carriage including a reversible, electrically energizable motor having high-torque, high-slip characteristics, a threaded shaft coaxial with and directly coupled to the armature shaft of said motor, the threaded shaft being mounted against axial movement and being driven by and at the same speed as said armature shaft, a hollow piston connected to said carriage and having a portion which threadedly engages said threaded shaft, said motor providing the sole power for advancing and retracting said carriage through the agency of said threaded shaft and piston, a cylinder which is occupied by said piston and which is adapted to accommodate a body of liquid for controlling the rate of traverse of said carriage by offering varying resistance to said piston in said cylinder, a reservoir for a body of said liquid, a conduit connecting said cylinder with said reservoir and through which liquid flows from said cylinder to said reservoir during feed strokes of said carriage and from said reservoir to said cylinder during return strokes of said carriage, said reservoir being located at a higher elevation than said cylinder so that the force of gravity will aid in the flow of liquid from said reservoir to said cylinder, a metering device in said reservoir with which said conduit communicates for reducing the rate of flow of liquid from said cylinder to said reservoir during a portion of the travel of said carriage to reduce the feeding rate of said carriage and at the same time increase the effective torque of said motor, and an electrically energizable valve controlled by said carriage for by-passing said metering device during another portion of the travel of said carriage to increase the rate of flow of liquid from said cylinder to permit said carriage to be driven at an increased rate by said motor.

THOMAS L. HALLENBECK.

REFERENCES CITED

The following references are of record in the file of this patent:

UNITED STATES PATENTS

| Number | Name | Date |
| --- | --- | --- |
| 588,021 | Short | Aug. 10, 1897 |
| 838,169 | Coyle | Dec. 11, 1906 |
| 1,069,995 | Anderson | Aug. 12, 1913 |
| 1,740,027 | Libani | Dec. 12, 1929 |
| 1,926,995 | Harkness | Sept. 12, 1933 |
| 1,998,873 | Kingsbury | Apr. 23, 1935 |
| 2,114,389 | Kingsbury | Apr. 19, 1938 |
| 2,182,624 | Dreyer | Dec. 5, 1939 |
| 2,444,228 | Huthsing | June 29, 1948 |